(12) United States Patent
Chen et al.

(10) Patent No.: US 7,095,374 B2
(45) Date of Patent: Aug. 22, 2006

(54) LOW-PROFILE EMBEDDED ULTRA-WIDEBAND ANTENNA ARCHITECTURES FOR WIRELESS DEVICES

(75) Inventors: Zhi Ning Chen, Singapore (SG); Brian Paul Gaucher, Brookfield, CT (US); Thomas Richard Hildner, Cary, NC (US); Duixian Liu, Yorktown Heights, NY (US)

(73) Assignee: Lenova (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/042,223

(22) Filed: Jan. 25, 2005

(65) Prior Publication Data

US 2006/0164305 A1 Jul. 27, 2006

(51) Int. Cl.
*H01Q 1/24* (2006.01)

(52) U.S. Cl. .............................. 343/702; 343/700 MS (58) Field of Classification Search ......... 343/700 MS, 343/702, 795

See application file for complete search history.

(56) References Cited

U.S. PATENT DOCUMENTS

| 5,926,150 | A | 7/1999 | McLean et al. ............. 343/846 |
| 6,018,324 | A * | 1/2000 | Kitchener .................... 343/795 |
| 7,015,868 | B1 | 3/2006 | Puente Baliarde et al. . 343/800 |
| 2005/0140553 | A1 | 6/2005 | Kuramoto ................... 343/702 |
| 2005/0156804 | A1 | 7/2005 | Ratni et al. ................. 343/773 |

* cited by examiner

*Primary Examiner*—Hoang V. Nguyen
(74) *Attorney, Agent, or Firm*—F. Chau & Associates LLC; Frank V. DeRosa (57) ABSTRACT

Low-profile, compact UWB embedded antenna designs are provided for use with computing devices, such as laptop computers, which enable ease of integration within computing devices with limited space, while providing suitable antenna characteristics (e.g., impedance matching and radiation efficiency) over an operating bandwidth of about 1 GHz to about 11 GHz.

24 Claims, 9 Drawing Sheets

FIG. 4 y-z plane: horizontal plane
x-z plane: vertical plane

Peak Gain, dBi

| angle\fGHz | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
|---|---|---|---|---|---|---|---|---|---|---|---|---|---|---|---|---|---|---|---|---|---|
| -30 | -7.1 | 0.0 | 0.0 | 3.1 | 0.8 | 1.4 | 2.6 | 2.4 | 3.2 | 0.4 | 0.7 | 3.6 | 3.4 | 4.2 | 2.6 | 3.1 | 1.6 | 1.0 | 0.6 | 0.3 | 0.9 |
| -25 | -6.7 | 0.6 | -0.4 | 3.1 | 1.3 | 3.0 | 1.7 | 4.0 | 2.3 | 1.3 | 1.3 | 3.5 | 3.1 | 4.0 | 2.3 | 2.1 | 1.2 | 0.1 | 0.6 | 0.5 | 2.0 |
| -20 | -6.4 | 1.0 | 0.3 | 2.9 | 2.0 | 2.0 | 3.2 | 2.9 | 3.2 | -0.5 | 1.9 | 2.5 | 3.4 | 3.8 | 2.2 | 1.5 | 2.7 | 0.7 | 1.0 | 1.3 | 1.1 |
| -15 | -6.2 | 0.9 | 0.8 | 2.5 | 1.5 | 2.7 | 2.1 | 4.2 | 2.9 | 0.6 | 1.7 | 2.5 | 3.2 | 3.9 | 1.9 | 2.1 | 4.2 | 2.3 | 1.6 | 1.7 | 3.0 |
| -10 | -6.0 | 0.6 | 0.7 | 2.8 | 1.3 | 3.7 | 3.5 | 3.1 | 2.9 | 0.3 | 1.8 | 3.3 | 4.7 | 3.0 | 3.2 | 2.6 | 4.3 | 3.0 | 0.6 | 0.9 | 2.4 |
| -5 | -6.0 | 0.7 | 0.7 | 2.8 | 2.5 | 3.4 | 2.6 | 4.2 | 3.0 | 0.9 | 2.6 | 3.5 | 4.3 | 3.1 | 2.6 | 2.5 | 4.0 | 3.2 | 1.0 | 1.3 | 2.4 |
| 0 | -5.7 | 0.4 | 1.0 | 2.6 | 2.3 | 2.9 | 2.1 | 3.3 | 3.2 | 2.2 | 1.8 | 2.8 | 4.2 | 4.1 | 2.6 | 3.1 | 3.7 | 3.3 | 1.7 | 2.0 | 2.3 |
| 5 | -5.4 | 1.0 | 0.9 | 2.3 | 1.5 | 2.6 | 2.7 | 4.4 | 2.5 | 1.3 | 2.9 | 3.5 | 4.7 | 3.7 | 3.0 | 3.7 | 4.0 | 2.4 | 1.9 | 1.8 | 2.2 |
| 10 | -5.2 | 1.4 | 0.4 | 2.4 | 2.1 | 3.2 | 2.2 | 3.2 | 3.1 | 2.7 | 1.5 | 3.6 | 3.7 | 3.8 | 3.6 | 2.9 | 4.3 | 2.1 | 2.9 | 3.2 | 1.7 |
| 15 | -5.4 | 1.7 | 0.4 | 2.5 | 2.5 | 4.0 | 1.7 | 3.4 | 3.0 | 2.5 | 2.5 | 3.1 | 4.6 | 4.5 | 4.1 | 2.6 | 4.4 | 3.4 | 2.7 | 2.3 | 1.7 |
| 20 | -4.9 | 2.4 | 1.1 | 2.0 | 2.4 | 2.9 | 2.0 | 3.4 | 2.7 | 3.2 | 2.1 | 2.3 | 3.7 | 4.3 | 3.6 | 3.5 | 2.1 | 2.8 | 2.1 | 2.2 | 0.4 |
| 25 | -4.2 | 2.8 | 1.2 | 1.9 | 2.2 | 2.0 | 2.9 | 2.7 | 3.2 | 1.4 | 2.5 | 1.5 | 2.0 | 3.8 | 2.6 | 2.4 | 2.5 | 4.3 | 1.6 | 1.6 | 1.0 |
| 30 | -3.8 | 2.7 | 3.1 | 1.8 | 1.3 | 1.5 | 1.9 | 1.8 | 3.2 | 2.5 | 1.8 | 2.3 | 2.0 | 3.8 | 3.0 | 2.9 | 0.8 | 1.1 | 2.0 | -0.8 | -0.7 |

FIG. 7A

Average Gain, dBi

| angle\fGHz | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
|---|---|---|---|---|---|---|---|---|---|---|---|---|---|---|---|---|---|---|---|---|---|
| -30 | -9.5 | -3.5 | -2.8 | -1.6 | -1.4 | -2.0 | -1.3 | -0.9 | -0.6 | -2.7 | -2.4 | -1.1 | -0.5 | 0.5 | -0.8 | -1.0 | -1.2 | -2.3 | -2.4 | -3.5 | -2.2 |
| -25 | -9.0 | -3.2 | -2.9 | -1.6 | -1.5 | -1.3 | -2.2 | -0.3 | -1.6 | -2.3 | -2.3 | -1.0 | -0.6 | 0.2 | -1.1 | -1.7 | -2.1 | -2.9 | -3.0 | -3.2 | -2.7 |
| -20 | -8.9 | -3.0 | -2.8 | -2.0 | -1.1 | -1.3 | -1.1 | -1.1 | -2.0 | -3.1 | -1.9 | -1.4 | -0.5 | -0.7 | -1.4 | -1.9 | -2.4 | -2.7 | -2.8 | -3.1 | -2.8 |
| -15 | -9.0 | -3.0 | -2.8 | -2.3 | -1.5 | -1.2 | -1.7 | -0.7 | -2.6 | -2.9 | -2.2 | -1.4 | -0.7 | -1.1 | -1.9 | -1.8 | -2.1 | -2.6 | -3.0 | -2.9 | -2.3 |
| -10 | -9.1 | -2.7 | -3.2 | -2.4 | -1.7 | -1.2 | -1.2 | -1.5 | -2.5 | -3.1 | -2.8 | -1.8 | -1.0 | -1.5 | -1.7 | -2.1 | -2.3 | -2.6 | -3.5 | -3.5 | -2.3 |
| -5 | -9.1 | -2.5 | -3.3 | -2.7 | -1.5 | -1.5 | -2.0 | -1.1 | -2.7 | -3.2 | -2.5 | -2.1 | -1.6 | -1.7 | -1.9 | -2.2 | -2.4 | -2.7 | -3.8 | -3.9 | -3.1 |
| 0 | -9.1 | -2.4 | -3.3 | -2.9 | -1.7 | -1.3 | -2.2 | -1.8 | -3.0 | -2.5 | -2.8 | -2.4 | -1.7 | -1.6 | -2.3 | -2.3 | -2.8 | -3.1 | -3.5 | -4.0 | -3.3 |
| 5 | -9.0 | -2.2 | -3.6 | -3.0 | -1.9 | -1.8 | -2.2 | -1.5 | -3.0 | -3.1 | -2.1 | -2.3 | -2.1 | -1.8 | -2.3 | -2.3 | -2.8 | -3.4 | -4.0 | -4.3 | -3.7 |
| 10 | -8.7 | -2.0 | -3.9 | -2.7 | -1.9 | -2.0 | -2.8 | -1.9 | -2.9 | -2.5 | -3.1 | -2.7 | -2.3 | -1.8 | -1.6 | -2.5 | -3.0 | -3.8 | -4.1 | -4.1 | -3.9 |
| 15 | -8.3 | -2.0 | -3.8 | -3.1 | -1.8 | -1.6 | -3.0 | -2.2 | -3.0 | -2.8 | -2.5 | -2.5 | -2.0 | -2.2 | -2.0 | -2.9 | -3.0 | -3.6 | -4.1 | -5.1 | -4.7 |
| 20 | -7.8 | -2.0 | -3.8 | -3.6 | -2.1 | -1.9 | -2.8 | -2.5 | -3.2 | -3.1 | -3.0 | -3.0 | -2.4 | -2.2 | -2.2 | -2.6 | -3.8 | -3.8 | -4.6 | -5.3 | -5.3 |
| 25 | -7.3 | -1.9 | -4.0 | -3.7 | -1.8 | -2.7 | -2.6 | -2.3 | -2.2 | -2.9 | -2.4 | -3.4 | -3.1 | -2.5 | -3.1 | -3.0 | -3.6 | -3.7 | -4.5 | -5.0 | -4.9 |
| 30 | -7.0 | -1.7 | -4.2 | -3.6 | -2.3 | -3.0 | -4.0 | -3.3 | -2.2 | -1.9 | -3.1 | -2.6 | -2.6 | -2.3 | -2.5 | -2.9 | -3.9 | -4.3 | -4.9 | -6.2 | -5.6 |

LOW-PROFILE EMBEDDED ULTRA-WIDEBAND ANTENNA ARCHITECTURES FOR WIRELESS DEVICES

TECHNICAL FIELD OF THE INVENTION

The present invention relates generally to embedded antenna designs for use with computing devices, such as laptop computers, to enable wireless connectivity and communication. More specifically, the invention relates to low-profile, compact embedded UWB (ultra-wideband) antenna designs that enable ease of integration within wireless devices with limited space, while providing suitable antenna characteristics and performance such as impedance matching and radiation efficiency over a wide bandwidth (e.g., 10 GHz) of operation.

BACKGROUND

Wireless connectivity and communication between devices in wireless networks/systems such as WPAN (wireless personal area network), WLAN (wireless local area network), WWAN (wireless wide area network), and cellular networks, for example, can be achieved by equipping wireless devices with antennas.

In general, wireless devices can be designed having antennas that are disposed external to, or embedded within, the housing of such wireless devices. For example, some portable laptop computers are designed with external antennas located at the top of the display unit of such computers, or external antennas that are located on a PC card. However, there are disadvantages associated with external antenna designs including, for example, high manufacturing costs and susceptibility of antenna damage, as well as the adverse appearance of the device due to the external antenna. With other portable laptop computer designs, antennas are embedded within the display unit of such computers.

In general, embedded antenna designs for wireless devices provide advantages over external antenna designs including, for example, better appearance of such devices and less possibility of accidental breakage of the antenna. However, when antennas are embedded within the housing of computing devices with limited space and lossy environments, antenna performance can be adversely affected. For instance, antennas that are embedded in the display unit of a laptop computer can experience interference from surrounding metallic components such as a metal display cover, display panel frame, etc, or other lossy materials, but such interference can be avoided by locating/orientating the embedded antenna in the display unit away from such metal/lossy components. However, as computing devices are made smaller with increasingly limited space, embedded antennas must be designed with more compact structures and profiles, which is problematic.

SUMMARY OF THE INVENTION

Another factor that is considered with embedded antenna designs is the operating bandwidth of such antennas. Indeed, different wireless systems/standards can be implemented for wireless devices such as laptop computers. For example, various wireless systems/standards, such as the 2.45 GHz ISM, WLAN 5.2/5.8 GHz, GPS (Global Positioning System) (1.575 GHz), PCS1800, PCS1900, and UMTS (1.92–2.17 GHz) systems are becoming increasingly popular for laptop computers and other portable devices. In addition, ultra-wideband (UWB) wireless systems covering 3.1 GHz–10.6 GHz band have been proposed as the next generation wireless communication standard, to increase data rate for indoor, low-power wireless communications or localization systems, especially for short-range WPAN applications. Using UWB technology, wireless communication systems may transmit and receive signals with more than 100% bandwidth with low transmit power typically less than −41.3 dBm/MHz.

In view of the various wireless standards that are currently available, it would be highly advantageous to develop low-profile, compact multiband, multi-standard antenna frameworks, which are capable of covering a wide operating bandwidth for implementation with multiple wireless systems/standards. Such antenna designs should provide sufficient antenna properties such as broadband impedance matching, high gain, and omni-directional radiation. Furthermore, such designs should be sufficiently small in volume for ease of integration within portable devices such as laptop computers, and low in cost for mass production.

Exemplary embodiments of the invention include compact, planar UWB antennas that provide multi-band operation/multi-standard implementation for wireless devices such as laptop applications. In particular, exemplary embodiments of the invention include compact UWB antenna designs that provide an operating bandwidth ranging from about 1.5 GHz to about 10.6 GHz, while maintaining a small profile (e.g., thin and low height) to meet the rigorous space constraints for, e.g., integration within display units of laptop computers, and providing low cost implementation. Exemplary antenna solutions according to the invention can be implemented with multiple wireless standards, covering frequency bands inclusive of the GPS band (1.575 GHz), the PCS bands (1.710–1.880 GHZ/1.850–1.990 GHz), the ISM bands (2.45, 5.15–5.35, and 5.47–5.825 GHz), and the UWB (3.1–10.6 GHz) band, while providing acceptable gain and omni-directional radiation patterns in the horizontal plane, while using a single feed point.

In one exemplary embodiment of the invention, an antenna comprises a first planar radiating element and a second planar radiating element comprising a first and a second portion. The first portion comprises a cone tip in the form of a first edge, and the first portion is coplanar with the first planar radiating element. The first planar radiating element comprises a first edge that is spaced apart and adjacent to the first edge of the first portion of the second planar radiating element.

In another exemplary embodiment of the invention, an antenna comprises a planar asymmetrical radiating element and a planar tapered radiating element spaced apart from the planar asymmetrical radiating element, wherein the planar asymmetrical radiating element is coplanar with at least a portion of the planar tapered radiating element.

In another exemplary embodiment of the invention, a computing device comprises a display unit comprising a flat panel display and a cover that houses the flat panel display, and an antenna embedded within the display unit. In one exemplary embodiment, the antenna comprises a first planar radiating element and a second planar radiating element comprising a first and a second portion. The first portion comprises a cone tip in the form of a first edge, and the first portion is coplanar with the first planar radiating element. The first planar radiating element comprises a first edge that is spaced apart and adjacent to the first edge of the first portion of the second planar radiating element. The antenna can be disposed between a sidewall of the flat panel display and a sidewall of the display cover such that the first planar radiator element is disposed above a surface of the flat panel display. The computing device further comprises an antenna feed such as, e.g., a coaxial cable having an inner conductor connected to the first planar radiating element to feed the antenna.

These and other exemplary embodiments, features and advantages of the present invention will be described or become apparent from the following detailed description of exemplary embodiments, which is to be read in connection with the accompanying drawings.

BRIEF DESCRIPTION OF THE DRAWINGS

FIGS. 7A and 7B are tables that illustrate measured peak gain and average gain (in dBi), respectively, of the prototype low-profile UWB antenna over a frequency range of 1~11 GHz.

DETAILED DESCRIPTION OF EXEMPLARY EMBODIMENTS

In general, exemplary embodiments of the invention include compact embedded antenna designs for use with computing devices to enable wireless connectivity and communication. For illustrative purposes, exemplary embodiments of the invention will be described in detail hereafter with regard to low-profile embedded antenna designs and methods for embedding low-profile antennas within display units of portable laptop computers (e.g., IBM ThinkPad computer), but nothing herein shall be construed as limiting the scope of the invention.

Figure 1A:
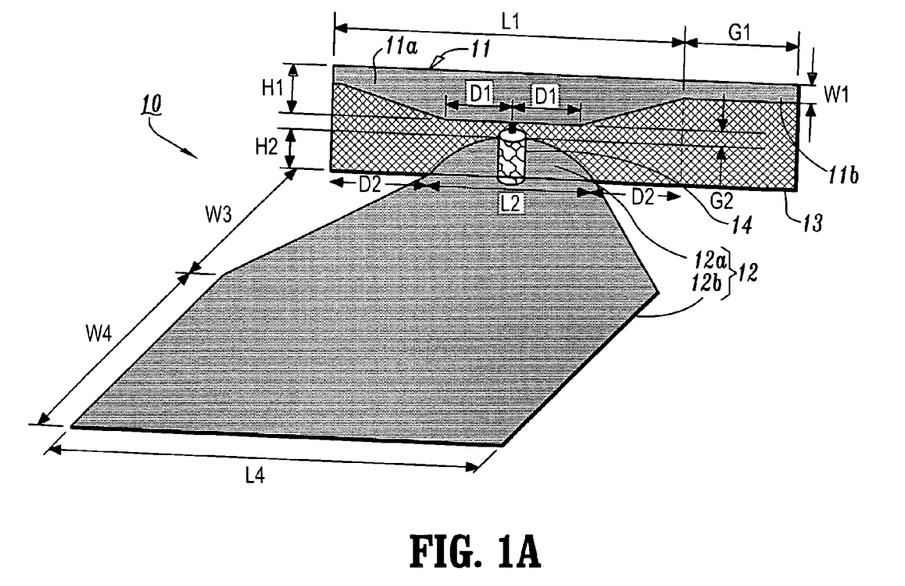
FIGS. 1A~1C schematically illustrate a low-profile UWB antenna according to an exemplary embodiment of the invention.
Figure 1B:
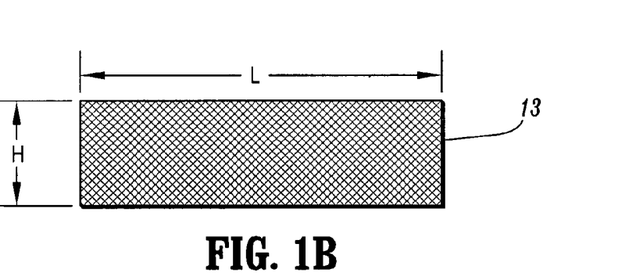
Figure 1C:
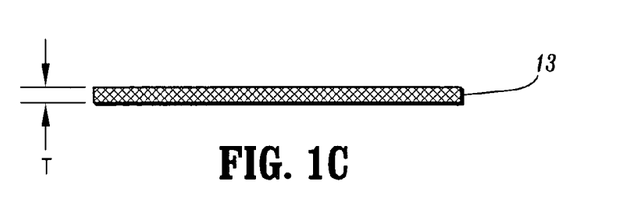

FIGS. 1A~1C schematically illustrate a low-profile UWB antenna according to an exemplary embodiment of the invention. More specifically, FIG. 1A is a schematic perspective view of a low-profile UWB antenna (10) comprising a first radiating element (11) (or "primary radiating element"), a second radiating element (12) (or "secondary radiating element") and a planar substrate (13) (e.g., PCB (printed circuit board)). The secondary radiating element (12) comprises a first (vertical) element (12a) and a second (horizontal) element (12b) which are disposed perpendicular to each other, for example. The vertical element (12a) and the first radiating element (11) are coplanar and patterned on one side of the substrate (13). In other exemplary embodiments of the invention, the antenna elements (11) and (12) can be formed/patterned on one side of a thin flexible substrate or PCB material that can be bent along a desired line to a desired angle to form the antenna (10). The first and secondary radiating elements (11) and (12) are preferably formed using a highly conductive metal sheet.

FIG. 1B is a back view of the antenna (10) which depicts the substrate (13) as having dimensions of H (height)×L (length), with no planar metal strips formed on a back surface of the substrate (13). FIG. 1C schematically illustrates the substrate (13) having a thickness T.

Referring again to FIG. 1A, a portion (11a) of the first radiating element (11) comprises a polygonal shape having an upper edge of length L1 and a bottom edge of length 2D1 and tapered side edges, and the upper and lower edges of the first radiating element (11) are separated by distance H1. The first radiating element (11) further comprises an additional metal strip (11b) of length G1 and width W1 extending from a top side of the polygonal radiating portion (11a). Essentially, the first radiating element (11) can be viewed as being an asymmetrical-shaped element (e.g., a sigma($\sigma$)-shaped structure). In accordance with an embodiment of the invention, an asymmetrically-shaped primary radiating element (such as radiating element (11)) provides a well-matched bandwidth over a very wide operating bandwidth.

The bottom edge of the first radiating element (11) is disposed adjacent to an upper edge portion of the vertical element (12a) and separated by a gap G2. The vertical element (12a) is coplanar with the first radiating element (11) and etched on the substrate (13). In the exemplary embodiment, the vertical element (12a) comprises a hemi-ellipse shape (wherein the entire upper edge is curved), which provides broadband impedance match. The vertical element (12a) has a bottom edge of length L2, which extends along a bottom edge of the substrate (13). The vertical element (12a) has a height H2 from the bottom of the substrate (13).

The bottom edge of the vertical element (12a) is connected to the horizontal element (12b). In the exemplary embodiment, the horizontal element (12b) is a polygonal-shaped. In particular, the horizontal element (12b) is depicted as having tapered side edges which extend an orthogonal distance W3 from bottom edge of the vertical element (12a), and which transition to straight edges (which are orthogonal to the substrate (13)) which extend a further distance W4 to an outer edge of length L4 which is parallel to the substrate (13). Collectively, the vertical and horizontal elements (12a) and (12b) form, in general, a tapered element or, more specifically, a planar cone-shaped element, a hexagonal-shaped element or similar shaped planar elements.

The first radiating element (11) is fed by a probe (inner conductor) extended from a 50Ω coaxial line (14), for example, wherein the probe is aligned with the mid-point of the bottom edge of the radiating element (11a). The outer ground shield of the coaxial cable (14) is electrically connected to the secondary radiating element (12) via solder connection. The first radiating element (11) provides the primary radiation of the antenna (10) while the secondary radiating element (12) provides little or insubstantial radiation such that the secondary radiating element (12) can be essentially considered a "ground" (although the radiating element (12) should not be connected directly to metallic/ grounded elements when disposed in a portable device).

In the exemplary embodiment of FIGS. 1A~1C, the secondary radiating element (12) is sized and shaped to provide wideband impedance match. The secondary radiating element (12) with a tapered-shape or cone-shaped enables reduction of the height of the antenna. On the other hand, the primary radiating element (11) provides the primary radiation of the antenna (10) and is essentially the tuning element such that small changes in the dimensions of the primary element (11) significantly affect the operating frequency of the antenna (10).

Figure 2A:
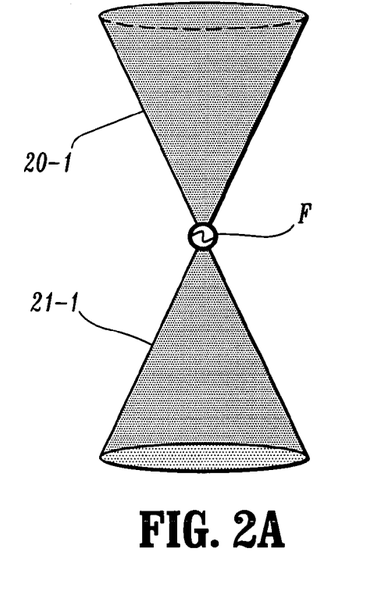
FIGS. 2A~2D are schematic diagrams illustrating design and development of a low-profile UWB antenna according to an exemplary embodiment of the invention.
Figure 2B:
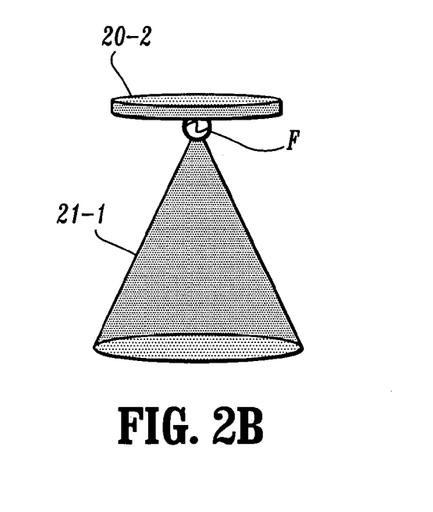

FIGS. 2A~2D are schematic diagrams illustrating evolution of various antenna embodiments illustrating design and development of a low-profile UWB antenna according to an exemplary embodiment of the invention. In particular, FIG. 2A shows a three-dimensional bi-conical antenna having mirror conical elements (20-1) and (21-1) with center feed (F), which framework is known by those of ordinary skill in the art to provide a broadband impedance response. In FIG. 2B, the upper cone element (20-1) of FIG. 2A is replaced with a 3D disc element (20-2), resulting in a 3D discone antenna framework, which provides a broad bandwidth with a lower profile.

Figure 2C:
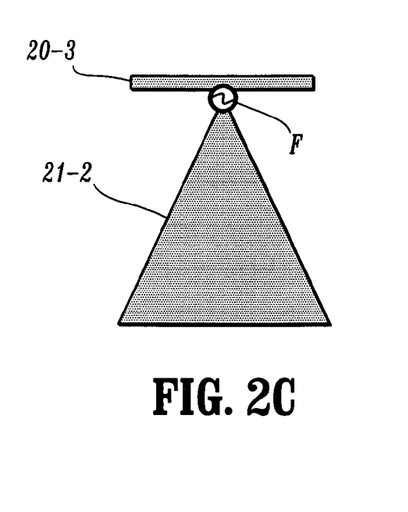

Next, the thickness of the antenna of FIG. 2B can be reduced by modifying the antenna of FIG. 2B to form a planar discone antenna (as depicted in FIG. 2C) having a planar strip element (20-3) and planar cone element (21-2). The planar discone antenna of FIG. 2C can be implemented for laptop computer applications, but due to the significant reduction in the volume of the antenna, the broadband characteristics of the antenna are degraded.

Figure 2D:
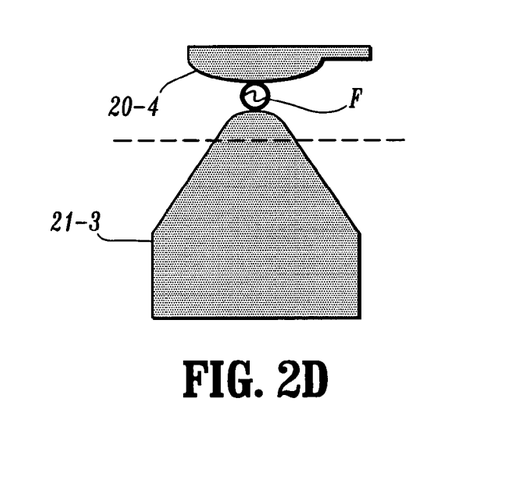

In accordance with exemplary embodiments of the invention, improved impedance match over a broad bandwidth is achieved by modifying the cone element (21-2) to replace the point (tip) by a smooth arc to form element (21-3) and by replacing the upper strip (20-3) with an asymmetrical shaped element (20-4) having a polygonal shape with an additional extended strip, such as shown in FIG. 2D. The exemplary planar antenna framework depicted in FIG. 2D is similar to that discussed above in FIGS. 1A–1C, wherein the planar (secondary) radiating element (21-3) can be bent along the dotted line to a desired angle. The smooth curved edge along the bottom of the upper planar radiator (20-4) and the smooth curved edge of the tip of the cone element (21-3) (between the feed element F) essentially forms a broadband impedance transformer.

The exemplary antenna (10) of depicted in FIGS. 1A~1C can be embedded within a display unit of a laptop computer. In general, a laptop display unit comprises a display cover, a display panel, and a frame that securely supports the display panel to the cover. The display cover may be formed of a metal, composite or plastic material. Depending on the laptop design, a shielding plate may be disposed on the back of the display panel for purposes of electromagnetic shielding.

To integrate the exemplary antenna (10) in a laptop display, the horizontal element (12b) in FIG. 1A can be inserted into the small gap between the back surface of the display panel and the inner surface of the display cover. However, the vertical and horizontal elements (12a) and (12b) of the secondary radiating element (12) should not touch any metal objects. For the case of metal display cover, insulation tape can be used to cover the vertical and horizontal elements (12a) and (12b) to ensure that no portion of the secondary radiating element (12) touches the metal cover or other metallic/ground elements of the device casing.

Because the display panel is very lossy, the height (H2) of the vertical element (12a) should be at least the same as the thickness of the sidewall of the display panel so that the first radiating element (11) is disposed above the surface plane of the display to achieve high radiation efficiency. To save laptop display space, the antenna (10) may be mounted at any desired location/orientation between the display cover and display panel such that the plane of the antenna (10) is substantially orthogonal (or slightly angled) with respect to the plane of the panel.

The geometric parameters of the exemplary antenna (10) depicted in FIGS. 1A~1C have different affects on the antenna performance and can be adjusted for tuning the antenna generally as follows. In general, the dimensions T and L of the dielectric substrate (13) (which supports the first radiating element (11) and vertical element (12a)) have an affect on the antenna operating bandwidth. In particular, as T and L are increased, the Q-value of the antenna increases which results in narrowing the bandwidth.

The dimensions H1 and L1 of the upper polygon radiating element (11) affect the impedance match. The dimensions G1 and W1 of the additional strip element (11a) are tuned to adjust the impedance match of the antenna, especially at the lower frequencies in operating bandwidth. Moreover, for the secondary radiating element (12) the dimensions H2, D2, L2 and W3 of the lower hemi-ellipse vertical element (12a) have a significant affect on the impedance match at the lower frequencies of the operating bandwidth. Further, the ratio of H2/W3 slightly affects the impedance match. To decrease the height of the antenna, the parameter H2 can be made small. However, for laptop applications, when H2 is made lower than the thickness of the LCD, the blockage of the LCD panel increases, and the radiation performance of the antenna is degraded. Therefore, for laptop applications, H2 is preferably selected to be at least the thickness of the LCD panel. The dimension L4 controls the characteristic impedance of the secondary radiating element (12) which affects the impedance match. The gap G2 significantly controls the impedance matching, particularly at higher frequencies. The location of the feed point, D1, is around the midpoint of the bottom of the upper polygon radiating element (11). The location of the feed point also affects the impedance matching.

Figure 3A:
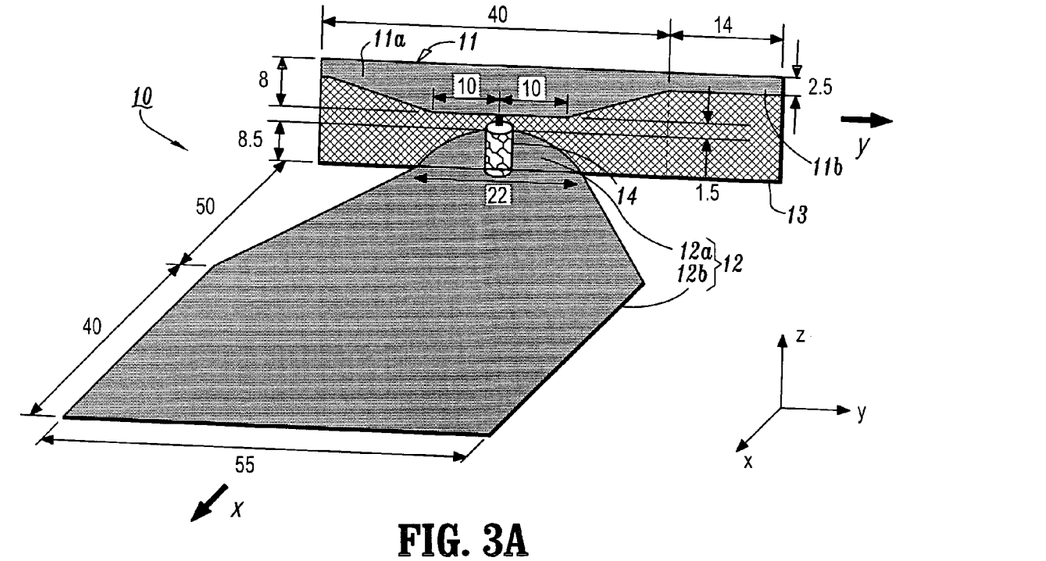
FIGS. 3A~3C illustrate dimensions of a prototype low-profile UWB antenna having a framework similar to the antenna of FIGS. 1A~1C to provide an operating bandwidth of about 1.5 GHz to about 10.6 GHz, according to an exemplary embodiment of the invention.
Figure 3B:
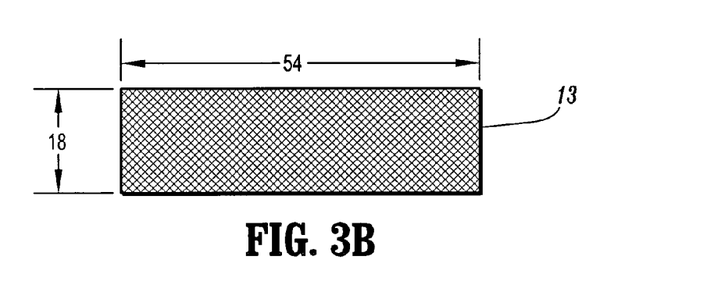
Figure 3C:
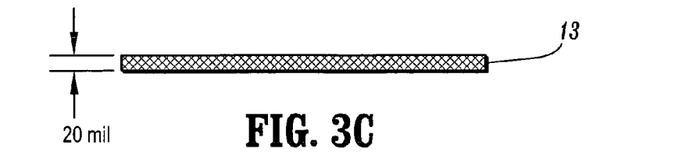

For purposes of testing and determining electrical properties and characteristics of a low-profile UWB antenna according to an exemplary embodiment of the invention, a prototype antenna was constructed using the antenna framework depicted in FIGS. 1A~1C for a laptop application. In particular, FIGS. 3A~3C illustrate specific dimensions (in millimeters (mm)) for an exemplary prototype UWB antenna having the antenna framework as depicted in FIGS. 1A~1C to provide an operating bandwidth of about 1 GHz to about 11 GHz. The antenna radiating element (11) and vertical element (12a) was etched onto 25N Arlon PCB slab of dimensions L=54 mm, H=18 mm and T=20 mil (0.5 mm) having a dielectric constant $\epsilon_r$=3.38 and a loss tangent of 0.0025 at 10 GHz. The RF cable outer conductor was soldered on a surface of the secondary radiator element (12)

Figure 4:
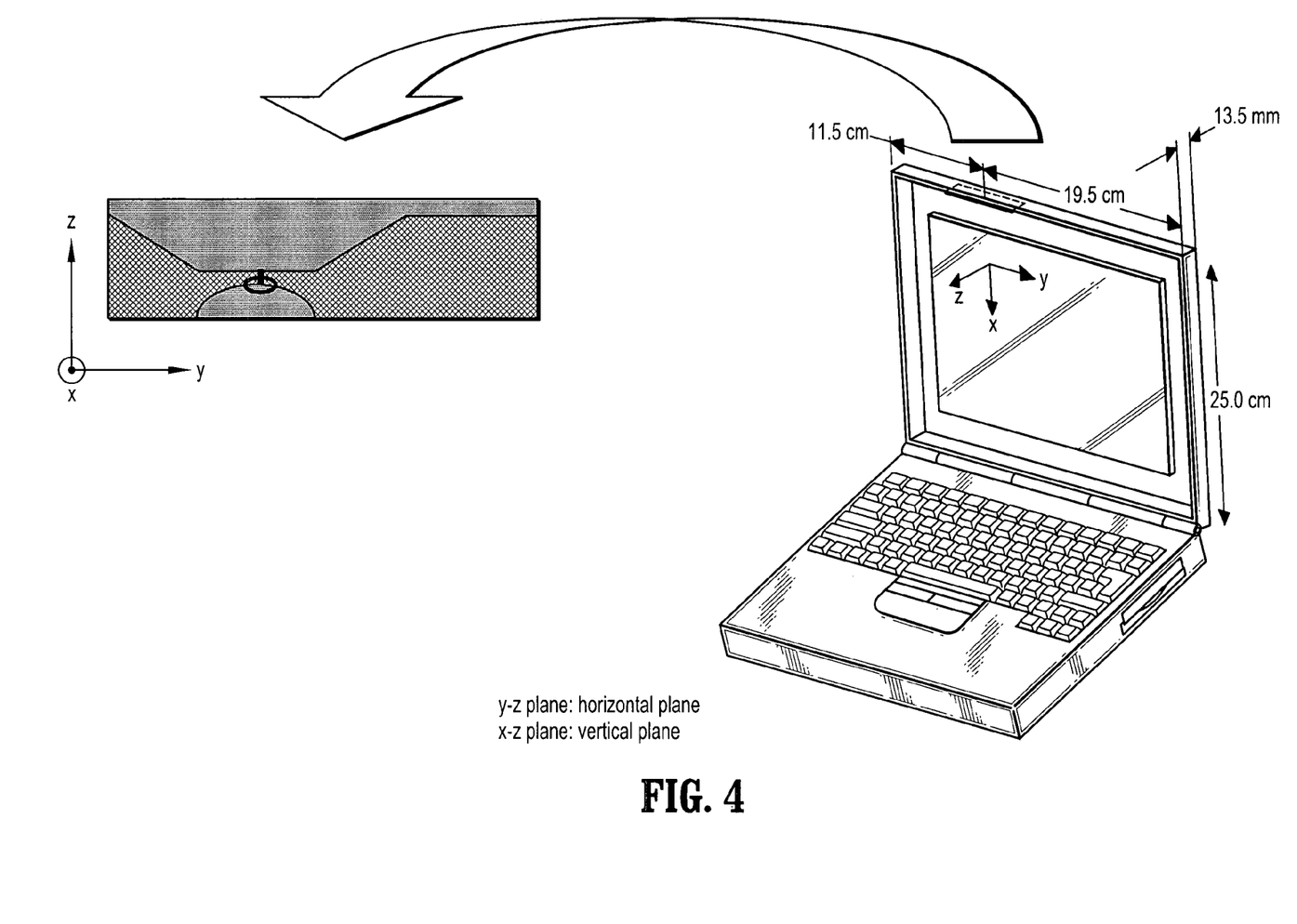
FIG. 4 schematically illustrates an embedded implementation of the prototype low-profile UWB antenna of FIGS. 3A~3C in a laptop computer, according to an exemplary embodiment of the invention.

The prototype antenna of FIGS. 3A~3C was installed in an IBM ThinkPad laptop computer (40) having a metal composite cover, in the location and orientation such as depicted in FIG. 4 (i.e., upper left regions of the display unit). The display unit of the computer (40) had a cover side wall of a height of 15 mm (inside). The cover side wall had a 50-mm long and 11-mm high slot, where the prototype antenna was installed. An RF feed cable of a length of 55 mm was installed through the metal cover to feed the antenna. The minimum distance between the frame of the display panel to the antenna (bottom) was about 3 mm. The thickness of the display panel was about 5 mm. Moreover, the prototype antenna was located/orientated within the display unit housing as depicted in FIG. 4. In particular, the substrate (13) was placed parallel to the cover side wall. In particular, the substrate (13) (y-z plane) was disposed substantially perpendicular to the plane of the display panel with the radiator portion extending past the plane of the display panel.

Figure 5:
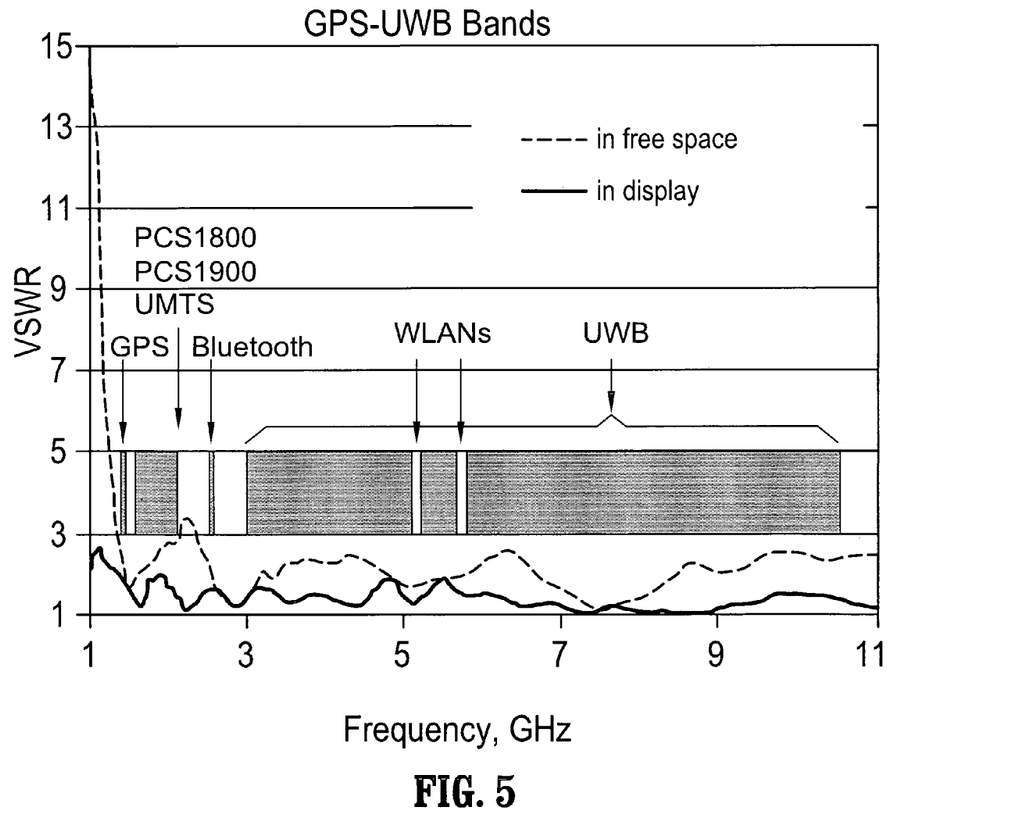
FIG. 5 graphically illustrates the measured SWR (or VSWR) of the prototype low-profile UWB antenna over a frequency range of 1~11 GHz.
Figure 6A:
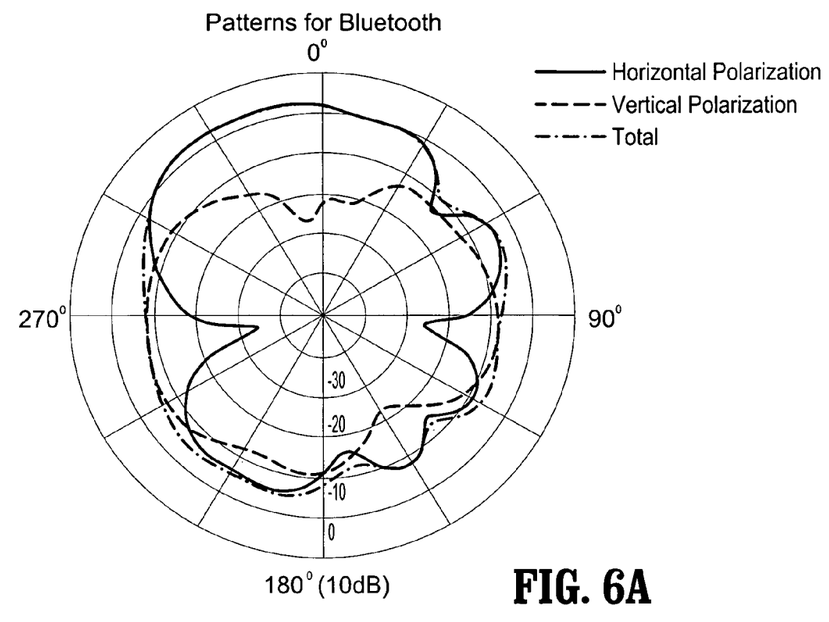
FIGS. 6A, 6B, 6C and 6D graphically illustrate measured radiation patterns of the prototype low-profile UWB antenna for Bluetooth, UWB, GPS and UMTS bands, respectively.
Figure 6B:
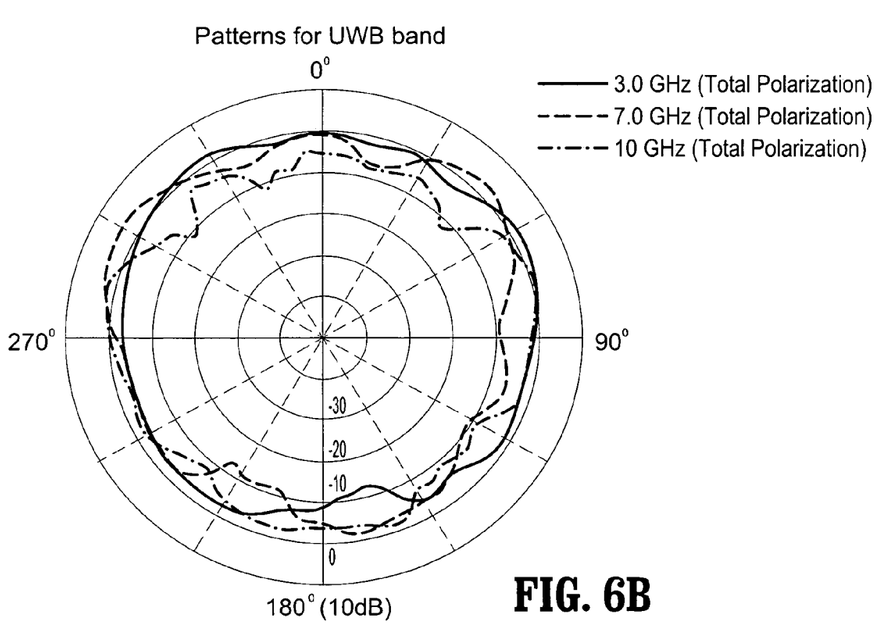
Figure 6C:
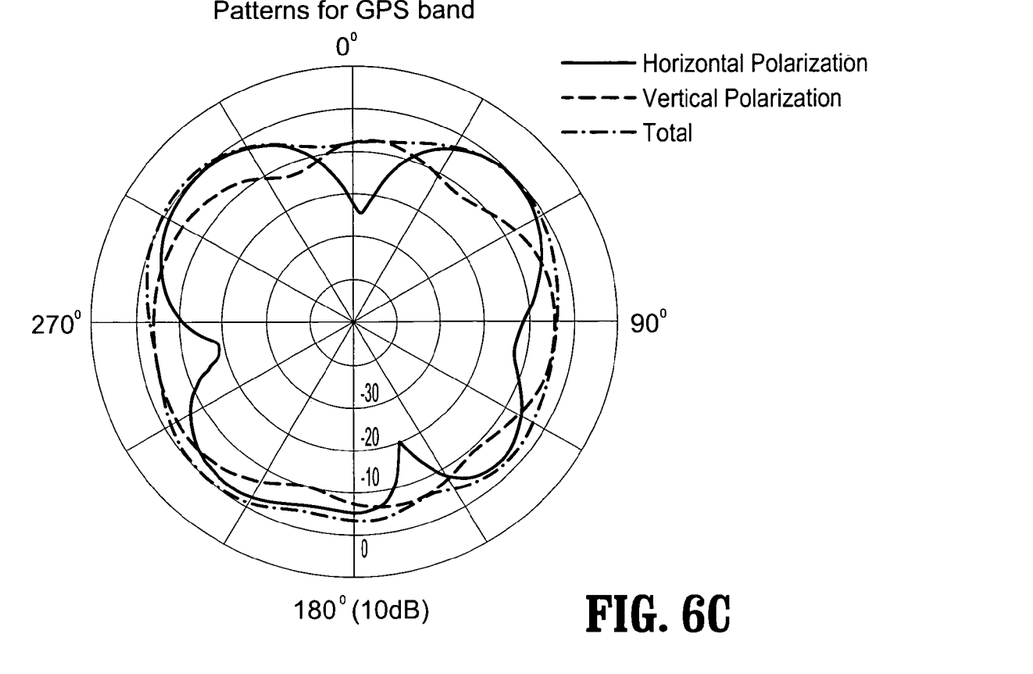
Figure 6D:
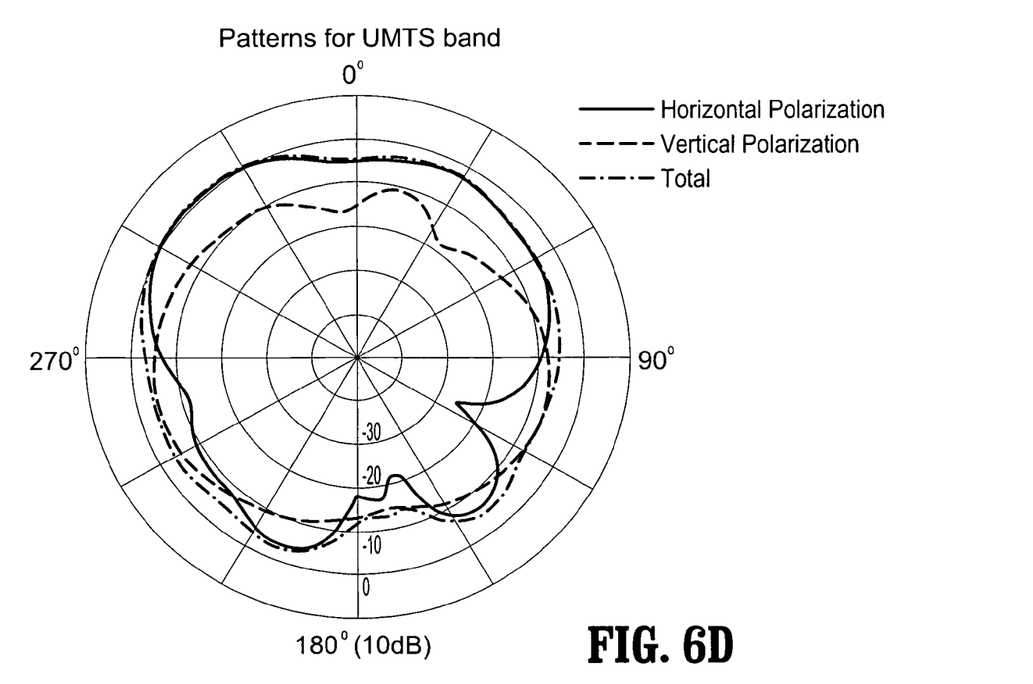

Voltage Standing wave ratio (VSWR or simply SWR) and radiation measurements were performed with the prototype UWB antenna both in free space and mounted in the prototype laptop in an anechoic chamber. FIG. 5 graphically illustrates the measured SWR of the prototype UWB antenna in free space (dotted line) and installed in the laptop display (solid line) over a frequency range of 1 GHz–11 GHz. As shown in FIG. 5, the exemplary prototype UWB antenna provided sufficient SWR bandwidth (3:1) to cover multiple bands, inclusive of the GPS band (1.5 GHz), the PCS band (1800/1900), the 2.4–2.5 GHz ISM band, the 5 GHz WLAN bands, and the UWB band (3.1 GHz–10.6 GHz). The effect of the installation environment on the matching was significant.

FIGS. 6A~6D are polar plots that depicted the measured radiation patterns on the horizontal plane (y-z plane) for the exemplary prototype antenna for the different bands when the laptop display was open 90° with respect to the base unit. In particular, FIGS. 6A, 6B, 6C and 6D illustrate the measured radiation patterns for the Bluetooth, UWB, GPS and UMTS bands, respectively, for frequencies of 1.5 GHz, 2.0 GHz, 2.5 GHz, 3.0 GHz, 7.0 GHz and 10.5 GHz. As is evident, over the bandwidth from 1.5 GHz–11 GHz, the radiation patterns maintain stable and omni-directional, especially in both the GPS and UWB bands, which renders the exemplary prototype antenna suitable for laptop applications.

Further, FIGS. 7A and 7B are tables that list the measured peak gain and average gain values over the range of 1–11 GHz. As shown, the gain values do not vary much across the bands. The peak and the average gains are, respectively, higher than 0 dBi and −4 dBi, which is sufficient for all the wireless standards.

Computer simulations were performed for an antenna having a framework similar to that depicted in FIG. 2D for the polygonal radiator without the extended metal strip, to determine the current distribution on the antenna at various frequencies including 1.5, 3.0, 7 and 10 GHz. The results of such simulations indicated that at all frequencies at which the antenna can efficiently radiate RF energy, wherein most of the energy radiation is from the region of the feed point. To maintain radiation efficiency, the feed point is kept as high as possible. This is one advantage of a discone or discone-like structure, which is not sensitive to the height (the thickness of 20-2 in FIG. 2B) of the top radiator. In theory, the resonant frequency or impedance match is independent of the height but dependent on the length (diameter) of the top radiator of a 3-dimensional discone structure. Here, due to the difference between the planar and the 3D structures, the effect of the height (H1 of FIG. 1A) of the upper radiator cannot be ignored.

It is to be understood that the exemplary UWB antennas described above are merely illustrative embodiments, and that one of ordinary skill in the art can readily envision other antenna frameworks that can be implemented based on the teachings herein. For instance, FIGS. 8A~8F schematically illustrate various planar radiating elements which can be implemented for constructing low-profile UWB antennas according to exemplary embodiments of the invention. As depicted, depending on application, the first (primary) radiator element can be modified to have varying types of asymmetrical shapes based on, e.g., the available space, desired antenna height, operating frequency range, degree of radiation at certain frequencies in the operating band, etc. With planar radiators, it is believed that most radiation occurs near the edges of the planar radiator, whereby regions of the radiator edges with shaper discontinuities provide increased radiation points, whereas planar radiators with smooth edges provide more uniform radiation along the edges.

Figure 8A:
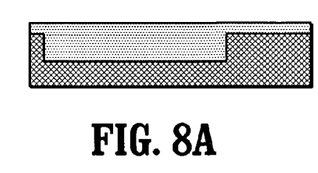
FIGS. 8A~8F schematically illustrate various planar radiating elements for low-profile UWB antennas according to exemplary embodiments of the invention.
Figure 8B:
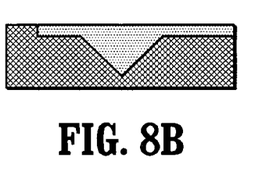
Figure 8C:
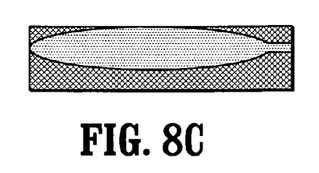
Figure 8D:
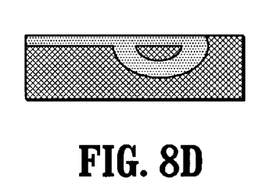
Figure 8E:
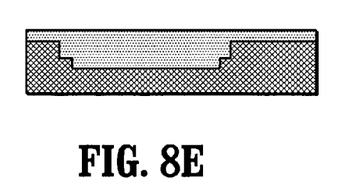
Figure 8F:
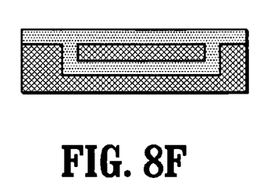

By way of example, the primary radiator shapes of FIGS. 8C and 8D provide wider operating bandwidths by virtue of the smoothed (rounded edges), whereas the radiator shapes of FIGS. 8A, 8E and 8F provide more energy at certain frequencies within the operating bandwidth to enhance radiation at such frequencies. Furthermore, the radiator shape of FIG. 8B with the tapered bottom edge provides a tradeoff in that radiator of FIG. 8B may provide a larger bandwidth than the radiator of element of FIG. 8A but smaller bandwidth than the radiator of FIG. 8C, for example. Moreover, planar radiators with notches such as depicted in FIGS. 8D and 8F can increase the radiation efficiency by focusing the radiating current towards the edges of the planar radiating elements. Moreover, as noted above, the asymmetrical shapes of FIGS. 8A~8F tend to increase the operating bandwidth. The asymmetrical structures are believed to prevent cancellation of the current distributions over the elements.

Figure 9A:
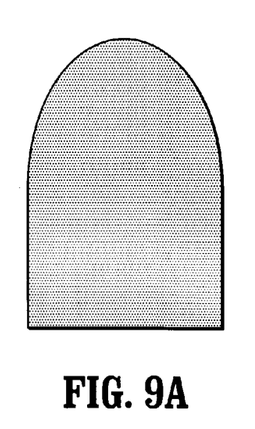
FIGS. 9A~9C schematically illustrate various planar radiating elements for low-profile UWB antennas according to exemplary embodiments of the invention.
Figure 9B:
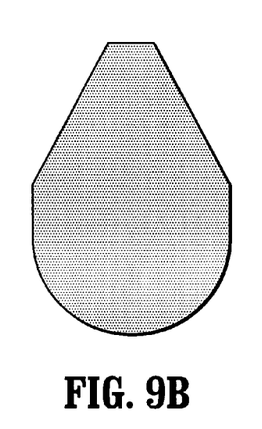
Figure 9C:
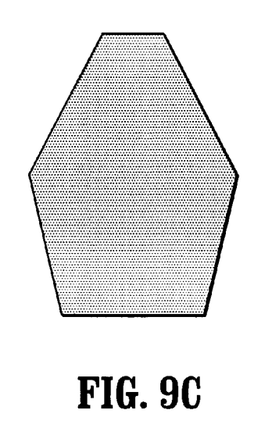

Moreover, FIGS. 9A~9C schematically illustrate various secondary radiating element shapes, which can be implemented for constructing low-profile UWB antennas according to exemplary embodiments of the invention. Moreover, the planar radiators can be slotted or notched or meandered to adjust antenna performance. Although the shapes of the secondary radiating elements do not significantly affect antenna performance (each of the secondary radiating elements of FIGS. 9A~9C provide similar performance), the tapered shape of such elements enables wideband operation. The smooth curved edges of the secondary radiating element of FIG. 9A provides somewhat increased performance with respect to wider bandwidth, although as noted above, the secondary radiating elements contribute little to the radiation and large dimensional changes provide small changes in antenna electrical characteristics.

Although illustrative embodiments have been described herein with reference to the accompanying drawings, it is to be understood that the present invention is not limited to those precise embodiments, and that various other changes and modifications may be affected therein by one skilled in the art without departing from the scope of the invention.

What is claimed is:

1. An antenna, comprising:
   a first planar radiating element; and
   a second planar radiating element comprising a first and a second portion, wherein the first portion comprises a cone tip in the form of a first edge, and wherein the first portion is coplanar with the first planar radiating element;
   wherein the first planar radiating element comprises a first edge that is spaced apart and adjacent to the first edge of the first portion of the second planar radiating element; and
   wherein the first and second portions of the second planar radiating element are connected at a bottom edge of the first portion and wherein the first and second portions are angled with respect to each other.

2. The antenna of claim 1, wherein the first planar radiating element and the first portion of the second planar radiating element are patterned on one side of a planar substrate.

3. The antenna of claim 1, wherein the first edge of the first portion comprises a curved portion.

4. The antenna of claim 1, wherein the first portion is semi-ellipse-shaped.

5. The antenna of claim 1, wherein the first planar radiating element is polygonal-shaped.

6. The antenna of claim 1, wherein the antenna operates over a bandwidth of about 1 GHz to about 11 GHz.

7. The antenna of claim 1, further comprising a single feed probe connected to a mid-point of the first edge of the first planar radiating element.

8. The antenna of claim 1, wherein the first planar radiating element is substantially sigma(σ)-shaped.

9. The antenna of claim 1, wherein both the first edge of the first planar radiating element and the first edge of the first portion of the second radiating element are curved.

10. The antenna of claim 9, wherein a portion of the first edge of the first planar radiating element and a portion of the first edge of the first portion of the second planar radiating element are angled with respect to each other.

11. The antenna of claim 1, wherein a portion of the first edge of the first planar radiating element and a portion of the first edge of the first portion of the second planar radiating element are substantially parallel.

12. The antenna of claim 1, wherein the second portion is polygonal-shaped or hexagonal-shaped.

13. The antenna of claim 12, wherein the second portion comprises a curved edge portion.

14. An antenna, comprising:
a first planar radiating element; and
a second planar radiating element comprising a first and a second portion wherein the first portion comprises a cone tip in the form of a first edge, and wherein the first portion is coplanar with the first planar radiating element;
wherein the first planar radiating element comprises a first edge that is spaced apart and adjacent to the first edge of the first portion of the second planar radiating element; and
wherein the first planar radiating element comprises a planar strip extending from a top edge thereof.

15. An antenna, comprising:
a planar asymmetrical radiating element; and
a planar tapered radiating element spaced apart from the planar asymmetrical radiating element,
wherein the planar asymmetrical radiating element is coplanar with at least a portion of the planar tapered radiating element.

16. The antenna of claim 15, wherein the planar tapered radiating element comprises a cone tip in the form of a first edge.

17. The antenna of claim 16, wherein the first edge of the tapered radiating element is spaced apart from a feed point of the planar asymmetrical radiating element.

18. The antenna of claim 15, further comprising a single antenna feed connected to the planar asymmetrical radiating element.

19. A computing device, comprising:
a display unit comprising a flat panel display and a cover that houses the flat panel display; and
an antenna embedded within the display unit, the antenna comprising:
a first planar radiating element; and
a second planar radiating element comprising a first and a second portion, wherein the first portion comprises a cone tip in the form of a first edge, and wherein the first portion is coplanar with the first planar radiating element;
wherein the first planar radiating element comprises a first edge that is spaced apart and adjacent to the first edge of the first portion of the second planar radiating element.

20. The computing device of claim 19, wherein the antenna is disposed between a sidewall of the flat panel display and a sidewall of the display cover such that the first planar radiator element is disposed above a surface of the flat panel display.

21. The computing device of claim 19, further comprising a coaxial cable having an inner conductor connected to the first planar radiating element to feed the antenna.

22. The computing device of claim 19, wherein the antenna comprises a planar substrate, wherein at least the first planar radiating element and the first portion of the second planar radiating element are patterned on one side of the planar substrate.

23. The computing device of claim 19, wherein the second portion subtends an angle with respect to the first portion of the second planar radiating element.

24. The computing device of claim 23, wherein the antenna comprises a planar substrate, wherein the first and second planar radiating elements are patterned on one side of the planar substrate.

* * * * *